United States Patent [19]

Sakurai

[11] Patent Number: 4,760,824

[45] Date of Patent: Aug. 2, 1988

[54] AUXILIARY AIR VOLUME CONTROL DEVICE FOR INTERNAL-COMBUSTION ENGINE

[75] Inventor: Hidetoshi Sakurai, Saitama, Japan

[73] Assignee: Honda Giken Kogyo Kabushiki Kaisha, Tokyo, Japan

[21] Appl. No.: 343

[22] Filed: Jan. 5, 1987

[30] Foreign Application Priority Data

Feb. 13, 1986 [JP] Japan .................. 61-29390

[51] Int. Cl.$^4$ .............................................. F02D 41/08
[52] U.S. Cl. ...................................... 123/339; 123/585
[58] Field of Search .............................. 123/339, 585; 364/431.11

[56] References Cited

U.S. PATENT DOCUMENTS 4,580,220 4/1986 Braun et al. .................. 123/339
4,580,536 4/1986 Takao et al. .................. 123/339

FOREIGN PATENT DOCUMENTS 59-39968 3/1984 Japan ................................ 123/339
59-168239 9/1984 Japan ................................ 123/339

Primary Examiner—Andrew M. Dolinar
Attorney, Agent, or Firm—Pollock, Vande Sande and Priddy

[57] ABSTRACT

An auxiliary air amount control device for an internal-combustion engine, which for the purpose of permitting uninterrupted control of the number of revolutions of the engine mainly during an idling operation of the engine, enables an auxiliary air amount control valve disposed in a bypass interconnecting the upstream and downstream sides of a throttle valve to be so controlled that the idling operation will be carried out properly even when an arithmetic device serving to set the opening degree or the position of the control valve is out of order. This is effected by feeding a prescribed command value to an air control valve of the solenoid type when the arithmetic device is out of order, and by varying the resistance of the valve solenoid coil as a function of engine temperature, so that the opening degree of the valve is jointly responsive to the fixed command and the engine temperature.

2 Claims, 2 Drawing Sheets

AUXILIARY AIR VOLUME CONTROL DEVICE FOR INTERNAL-COMBUSTION ENGINE

BACKGROUND OF THE INVENTION

1. Field of the Invention

This invention relates to an auxiliary air amount control device for an internal-combustion engine, and particularly to an auxiliary air amount control device for an internal-combustion engine, which for the purpose of permitting uninterrupted control of the number of revolutions of the engine mainly during an idling operation of the engine, enables an auxiliary air amount control valve disposed in a bypass interconnecting the upstream and downstream sides of a throttle valve to be controlled in such a manner that the idling operation will be carried out even when an arithmetic device serving to set the opening degree or the position of the control valve is out of order.

2. Description of the Prior Art

Heretofore, it has been customary, while the internal-combustion engine is in the process of an idling operation, namely an operation continued with the throttle valve of the engine kept in a practically closed state, to control the number of revolutions of the engine by the use of an auxiliary air amount control valve (hereinafter referred to simply as a "control valve") disposed in a bypass interconnecting the upstream and downstream sides of the throttle valve. In the auxiliary air amount control device of this principle, the opening degree or the position of the control valve is feedback controlled such that the actual number of revolutions of the engine will agree with the target number of idling revolutions set in advance as a function of the temperature of engine cooling water. Such a feedback control method is described in detail in the specification of Japanese patent application No. SHO 60(1985)-137,445, for example.

For use in combination with said system for feedback control of the number of revolutions of the engine, another auxiliary air amount control device has been proposed which is adapted to detect the real electric current flowing to a drive coil of the control valve and effect feedback control of the electric current flowing to the drive coil so that the magnitude of the real electric current will agree with the target magnitude of electric current obtained in advance by dint of the system for the feedback control of the number of revolutions of the engine mentioned above. The method which controls the number of revolutions of the engine during an idling operation thereof by utilizing the system for the feedback control of the number of revolutions of the engine and the system for feedback control of the electric current is described in detail in the specification of Japanese patent application SHO No. 60(1985)-233,355, for example.

The conventional techniques described above have entailed the following problems.

The feedback control by either of the methods described above is effected by an electronic control device disposed in an automobile carrying the engine of interest. If the arithmetic unit of electronic control device develops trouble for one reason or another, the feedback control will no longer be normally carried out. As the result, there ensues a possibility that the idling operation will no longer be continued stably.

There is another possibility that the value of the command to be fed to the control valve or the opening degree of the control valve will fall to nil. There are times when the idling operation will become substantially impossible.

BRIEF SUMMARY OF THE INVENTION

For the solution of these problems, this invention contemplates the provision means capable of feeding a prescribed command value to the control valve when the arithmetic unit of the electronic control device develops a trouble thereby enabling the control valve to be kept at a fixed opening degree and consequently ensuring a practical idling operation to be continued even when the arithmetic unit develops a trouble.

DETAILED DESCRIPTION OF THE INVENTION

Now, this invention will be described in detail below with reference to the accompanying drawings.

Figure 2:
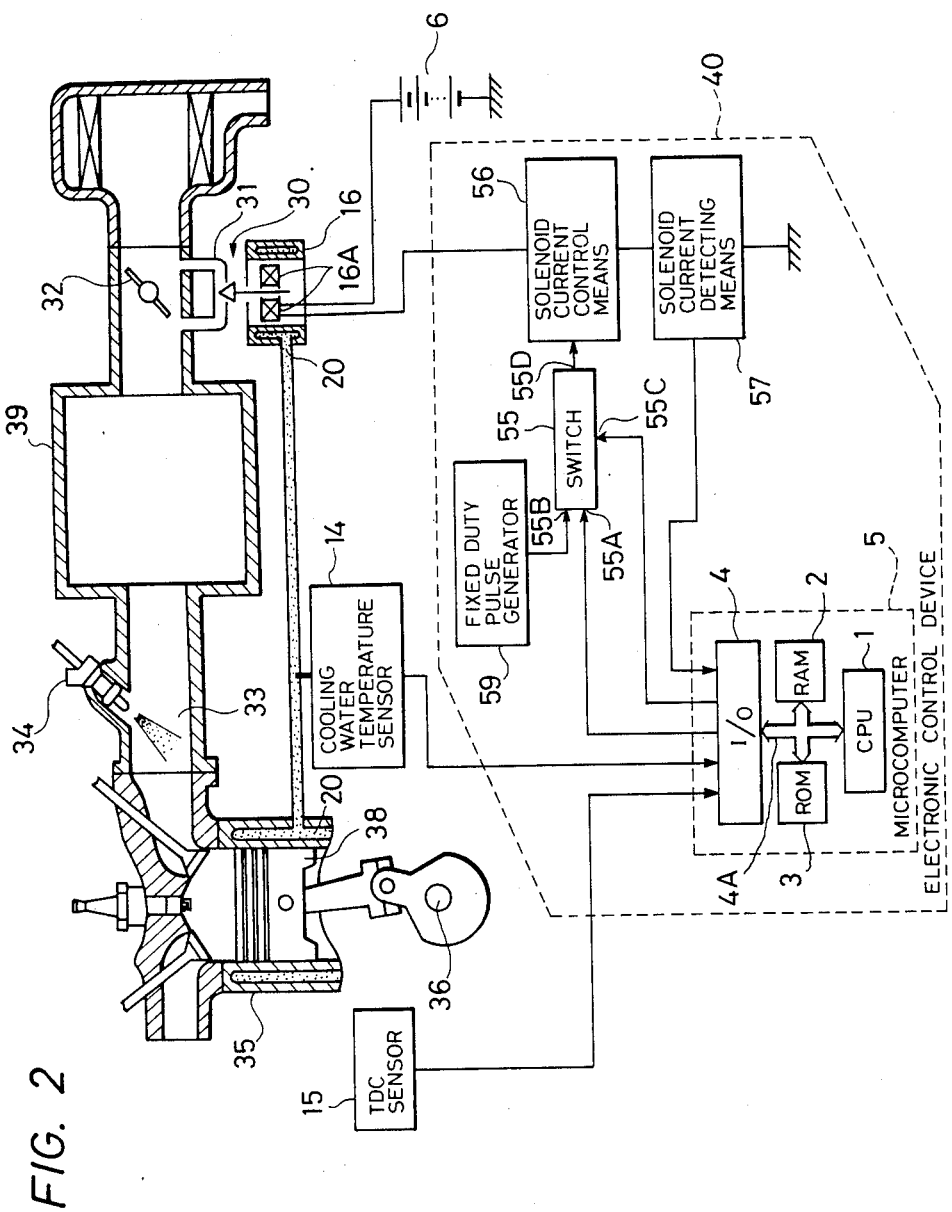
FIG. 2 is a schematic block diagram of the embodiment of this invention.

As illustrated in FIG. 2, a bypass passage 31 which communicates to the upstream and downstream sides of a throttle valve 32 disposed in an inspired air passage of an internal-combustion engine is provided with a control valve 30. The control valve 30 has the opening degree thereof controlled by a solenoid 16. An injection nozzle 34, by the known mechanism, injects the fuel in the amount to be determined in accordance with the amount of inspired air into an intake manifold 33 at a prescribed timing. A chamber 39 is disposed in the inspired air passage intervening between the throttle valve 32 and the injection nozzle 34 in order for the engine to generate a high output.

A TDC sensor 15 issues a pulse (TDC pulse) when a piston 38 of a given cylinder 35 reaches a point 90 degrees short of the top dead center. In other words, the TDC sensor 15 generates the same number of TDC pulses as the number of air cylinders each time a crank shaft 36 makes two complete rotations. A pipe for engine cooling water 20 is laid around the cylinder 35 and the solenoid 16 so as to circulate the cooling water around the peripheries thereof. The circulation of the engine cooling water 20 to the solenoid 16 is intended to prevent the solenoid 16 from being frozen or being overheated. The temperature of the engine cooling water 20 is detected by an engine cooling water temperature sensor 14.

A microcomputer 5, as widely known, is composed of a CPU 1, a RAM 2, a ROM 3, an input/output interface (I/O) 4, and a bus 4A for interconnecting these components.

The TDC pulses issued from the TDC sensor 15 and the engine cooling water temperature detected by the engine cooling water temperature sensor 14 are fed to the input/output interface 4.

A coil 16A of the solenoid 16 has one end thereof connected to a battery 6 and the other end thereof connected to a solenoid current control means 56. The solenoid current control means 56 is grounded via a solenoid current detecting means 57.

The solenoid current detecting means 57 detects the magnitude of electric current flowing to the coil 16A of the solenoid 16 and generates a signal indicating the detected mangitude to the input/output interface 4.

A switch 55 is provided with a pair of input terminals 55A, 55B and an output terminal 55D and is adapted to connect the output terminal 55D to either of the input terminals 55A and 55B, depending on whether or not a control signal is fed to a control terminal 55C thereof.

The input terminal 55B is connected to a fixed duty pulse generator 59, and the input terminal 55A and the control terminal 55C are connected to the input/output interface 4 of the microcomputer 5. The output terminal 55D is connected to the solenoid current control means 56.

As illustrated in FIG. 2, the microcomputer 5, the switch 55, the solenoid current control means 56, solenoid current detecting means 57, and the fixed duty pulse generator 59 are included in the electronic control device 40.

Now, the operation of the embodiment of this invention as illustrated in FIG. 2 will be described with reference to FIG. 1.

Figure 1:
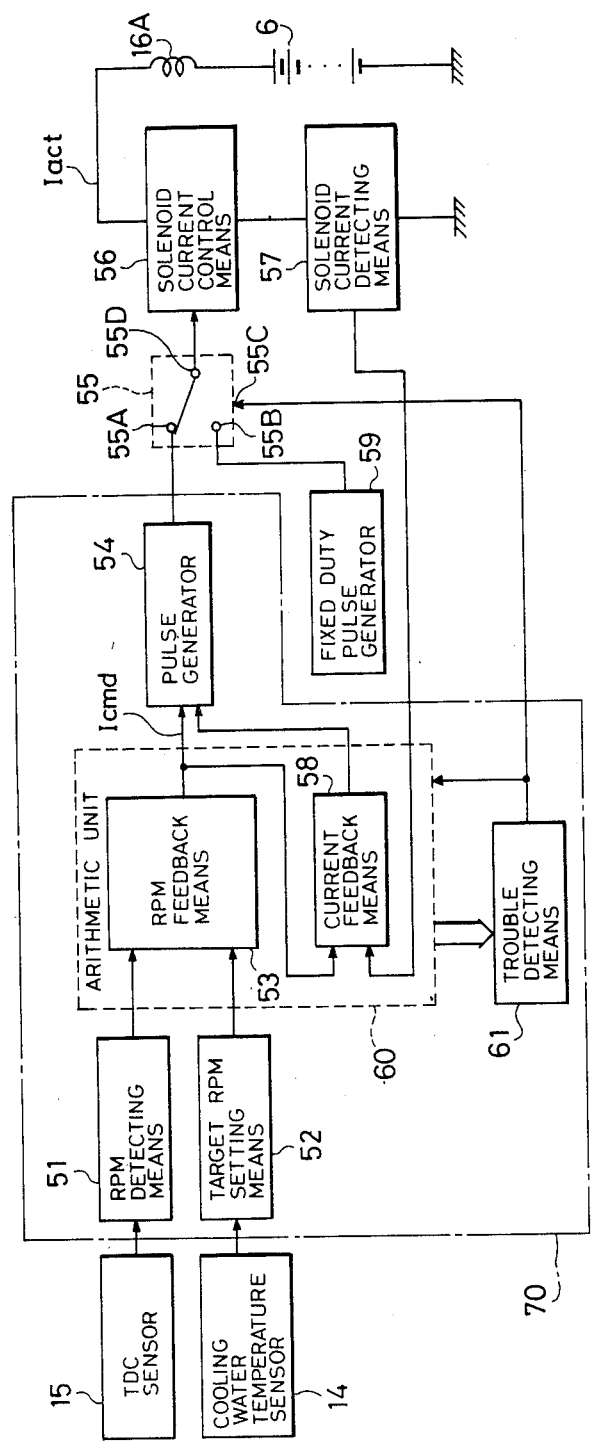
FIG. 1 is a functional block diagram of an embodiment of this invention.

FIG. 1 is a functional block diagram of a preferred embodiment of this invention, wherein a block 70 enclosed with a chain line portrays the function of the microcomputer 5. In FIG. 1, the reference numerals which have their equals in FIG. 2 denote identical or similar parts.

As illustrated in FIG. 1, the TDC pulse generated in the TDC sensor 15 is fed to an engine revolution number detecting means 51. In the engine revolution number (RPM) detecting means 51, the reciprocal of the output interval time of the TDC pulse, namely the number of revolutions of the engine, is calculated.

A target revolution number setting means 52, on the basis of the engine cooling water temperature detected by the engine cooling water temperature sensor 14, seeks a target number of revolutions from a target idling revolution number table set in advance as a function of the engine cooling water temperature.

An engine revolution number feedback means 53, based on the deviations of the number of revolutions of the engine from the target number of idling revolutions, outputs a command value, Icmd, for fixing the magnitude of electric current flowing to the coil 16A of the solenoid 16 so that the number of revolutions of the engine will approximate or coincide with the target number of idling revolutions. The command value, Icmd, is fed out to the pulse generator 54.

The pulse generator 54 generates pulses of a fixed cycle and sets the duty ratio of the pulses at a value corresponding to the command value, Icmd.

The switch 55, during the normal operation of the arithmetic unit 60, interconnects the input terminal 55A and the output terminal 55D. As the result, the pulse signal of a variable duty ratio generated in the pulse generator 54 is fed out to the solenoid current control means 56. The solenoid current control means 56 controls the current flowing to the coil 16A of the solenoid 16 in accordance with the duty ratio of the pulse signal being supplied through the switch 55.

The magnitude, Iact, of the real current flowing to the coil 16A is detected by the solenoid current detecting means 57 and fed back to the current feedback means 58. The current feedback means 58 compares the magnitude of the Iact with the magnitude of Icmd output by the engine revolution number feedback means 53 and generates a correction value, Dfb, which is supplied to the pulse generator 54 so that the magnitude of Iact will approximate or coincide with the magnitude of Icmd.

When the arithmetic unit 60 of the electronic control device 40, namely, the engine revolution number feedback means 53 and the current feedback means 58, is functioning normally, the magnitude of the electric current to the coil 16A (the opening degree or the position of the control valve 30) is controlled as described above to effect the idling operation in such a manner that the number of revolutions of the engine will agree with the target number of idling revolutions.

When the arithmetic unit 60 develops trouble, namely when the CPU 1 of the microcomputer 5 (FIG. 2) runs out of control, for example, this malfunction is detected by an arithmetic unit trouble detecting means 61. The arithmetic unit trouble detecting means 61 can be formed of a watchdog timer, for example.

When the arithmetic unit trouble detecting means 61 detects a malfunction of the arithmetic unit 60, it resets the arithmetic unit 60 and, at the same time, outputs a control signal to the control terminal 55C of the switch 55.

The switch 55 is consequently turned so as to interconnect the input terminal 55B and the output terminal 55D. As the result, the output signal from the fixed duty pulse generator 59 is fed to the solenoid current control means 56 in place of the output signal from the pulse generator 54.

The fixed duty pulse generator 59 generates a pulse signal which has a predetermined fixed duty ratio and is same in frequency as the pulse fed out from the pulse generator 54. The fixed duty pulse generator 59 can be formed of an astable multivibrator, for example.

When a malfunction is detected in the arithmetic unit 60, the duty ratio of the pulse signal fed to the solenoid current control means 56 is changed to the prescribed value and the control valve 30 is adjusted to the prescribed opening degree or position.

When the duty ratio of the pulse signal fed to the solenoid current control means 56 is changed to the prescribed value in consequence of detection of a malfunction in the arithmetic unit 60 as described above, the magnitude of the solenoid current is governed by the magnitude of resistance of the coil 16A so long as the control continues with the output kept at the prescribed value mentioned above because the current feedback loop is intentionally kept open as noted from FIG. 1.

The magnitude of resistance of a metal, as universally known, generally decreases in proportion as the ambient temperature falls. Since the engine cooling water 20 is circulated to the solenoid 16 serving to control the opening degree of the control valve 30 as already described with reference to FIG. 2, it can be assumed that the temperature of the solenoid 16 is practically equal to that of the engine cooling water 20.

When the temperature of the engine cooling water is low and the target number of idling revolutions must be fixed at a higher level, since the magnitude of resistance of the coil 16A is lowered more electric current than the current to be estimated from the pulse signal possessing the duty ratio mentioned above flows to the coil 16A of the solenoid 16. As the result, the amount of auxiliary air flowing through the bypass 31 is increased and the actual number of idling revolutions is also increased.

Conversely when the temperature of the engine cooling water is high, as after completion of the engine warming, and the target number of idling revolutions must be set at a lower level, since the magnitude of resistance of the coil 16A is heightened less current than the current estimated from the pulse signal possessing the duty ratio mentioned above flows to the coil 16A of the solenoid 16. As the result, the amount of auxiliary air flowing to the bypass 31 is decreased and the actual number of idling revolutions is also decreased.

If there already exists an auxiliary air amount control device in which the arithmetic unit 60 is provided with the engine revolution number feedback means 53 and/or the current feedback means 58 and the energization of the solenoid current control means 56 is set in accordance with the duty ratio of the pulse signal, application of the present invention to said device is attained simply by supplementing said device with the fixed duty pulse generator 59. This means that the auxiliary air amount control device utilizing the present invention inexpensively can be offered.

When the control valve 30 comprises an electromagnetic proportionating valve in which the magnitude of drive current of the solenoid is substantially proportional to the amount of shift or lift of the valve, the idling revolution number controlling property of the valve becomes all the more practical because the amount of auxiliary air passed through the bypass 31, namely the target number of idling revolutions, is allowed to be linearly varied.

Although the present invention has been described above as applied to an auxiliary air amount control device incorporating therein a system for feedback control of the number of revolutions of the engine and a system for feedback control of the magnitude of electric current, the present invention is not particularly limited to such a device. Optionally, the present invention may applied to an auxiliary air amount control device incorporating therein only a system for feedback control of the number of revolutions of the engine (such as, for example, a device of the configuration of FIG. 1, minus the blocks 57 and 58).

Where the output of the pulse generator 54 is reduced to nil when the arithmetic unit 60 is reset, the switch 55 can be omitted and the pulse generator 54 and the fixed duty pulse generator 59 can be directly connected to the solenoid current control means 56 by devising the fixed duty pulse generator 59 so that it will be energized only during the resetting of the arithmetic unit 60.

As noted from the foregoing description, the present invention brings about the following effects.

(1) When the arithmetic unit of the electronic control device develops trouble, since the command for fixing the magnitude of the electric current flowing to the coil of the solenoid which serves to drive the control valve is changed to the prescribed value, the idling operation of the internal-combustion engine can be continued even in the presence of the trouble.

(2) Where the engine cooling water is circulated to the solenoid, the number of idling revolutions can be proportionated to the temperature of the cooling water because the magnitude of resistance of the coil of the solenoid decreases and the magnitude of the real electric current flowing to the coil increases in proportion as the temperature of the engine cooling water falls. As the result, there can be obtained a highly practical ability to continue the idling operation of the engine even when the arithmetic unit malfunctions.

What is claimed is:

1. An auxiliary air control device for a liquid cooled internal-combustion engine, comprising a control valve disposed in an air bypass that communicates between the upstream and downstream sides of a throttle valve inserted in an inspired air passage of said internal-combustion engine, said control valve including a solenoid valve whose degree of opening is responsive to the magnitude of an electric current which flows through a solenoid coil associated with said valve thereby to vary the amount of air flowing through said bypass substantially in proportion to the value of a command that is supplied to said control valve, arithmetic means for calculating the value of the command that is supplied to said control valve so as to cause the number of revolutions of said engine to agree with a target number of idling revolutions, trouble detecting means for detecting a malfunction of said arithmetic means, means for generating a predetermined fixed command value, switch means responsive to the detection of a malfunction by said trouble detecting means for supplying said predetermined fixed command value to said control valve in place of the command valve from said arithmetic means, and means for circulating the engine cooling liquid around the periphery of said solenoid valve to vary the resistance of said solenoid coil with changes in the temperature of the engine cooling liquid, so that the magnitude of the electric current flowing through said solenoid coil, and accordingly the degree of opening of said control valve when there is a malfunction of said arithmetic means, is a joint predetermined desired function of said fixed command value and the temperature of the engine cooling liquid.

2. The auxiliary air control of claim 1 wherein said arithmetic means, when properly functioning, is responsive to a deviation between said command value and the electric current actually flowing in said solenoid to control the magnitude of the current flowing in said coil via a feedback loop, said switch means being operative to open said feedback loop in response to the detection by said trouble detecting means of a malfunction in said arithmetic means.

* * * * *